(12) United States Patent
Homstvedt et al.

(10) Patent No.: US 6,868,907 B2
(45) Date of Patent: Mar. 22, 2005

(54) OUTLET ARRANGEMENT FOR DOWN-HOLE SEPARATOR

(75) Inventors: Gunder Homstvedt, Oslo (NO); Geir Inge Olsen, Oslo (NO); Bjørnar Danielsen, Asker (NO)

(73) Assignee: Kvaerner Oilfield Products AS, Lysaker (NO)

( * ) Notice: Subject to any disclaimer, the term of this patent is extended or adjusted under 35 U.S.C. 154(b) by 0 days.

(21) Appl. No.: 10/258,081

(22) PCT Filed: Apr. 9, 2001

(86) PCT No.: PCT/NO01/00156

§ 371 (c)(1),
(2), (4) Date: Jan. 23, 2003

(87) PCT Pub. No.: WO01/78860

PCT Pub. Date: Oct. 25, 2001

(65) Prior Publication Data

US 2003/0141057 A1 Jul. 31, 2003

(30) Foreign Application Priority Data

Apr. 13, 2000 (NO) .......................... 20001954

(51) Int. Cl.⁷ .............................. E21B 43/38
(52) U.S. Cl. .................. 166/265; 166/50; 166/242.1
(58) Field of Search .................. 166/265, 50, 313, 166/242.1; 210/521

(56) References Cited

U.S. PATENT DOCUMENTS 5,443,120 A * 8/1995 Howell .................. 166/265
6,277,286 B1 * 8/2001 Søntvedt et al. ......... 166/250.03
6,547,005 B2 * 4/2003 Haheim ..................... 166/265
6,691,781 B2 * 2/2004 Grant et al. ................ 166/265
6,719,048 B1 * 4/2004 Ramos et al. .......... 166/250.15
2002/0153326 A1 * 10/2002 Oddie ........................ 210/747
2003/0037923 A1 * 2/2003 Emanuele et al. .......... 166/265

FOREIGN PATENT DOCUMENTS

NO    A 2000 0900    8/2001

OTHER PUBLICATIONS

International Publication No. WO 98/41304 published on Sep. 24, 1998 of International Application No. PCT/NO98/00085 filed on Mar. 18, 1998 entitled A Method and Device for the Separation of a Fluid in a Well.

* cited by examiner

Primary Examiner—Hoang Dang
(74) Attorney, Agent, or Firm—Knobbe, Martens, Olson & Bear, LLP

(57) ABSTRACT

A method and an arrangement for separating oil and water by means of a two-phase liquid/liquid separator. The oil phase and the water phase respectively are separated over a portion of the length of the separator from an upstream end to a downstream end. The oil phase and the water phase respectively are extracted gradually over a length of the separator, and each of the phases is conducted out of the separator separately. A method and an arrangement for orienting the separator in a well are also described.

14 Claims, 5 Drawing Sheets

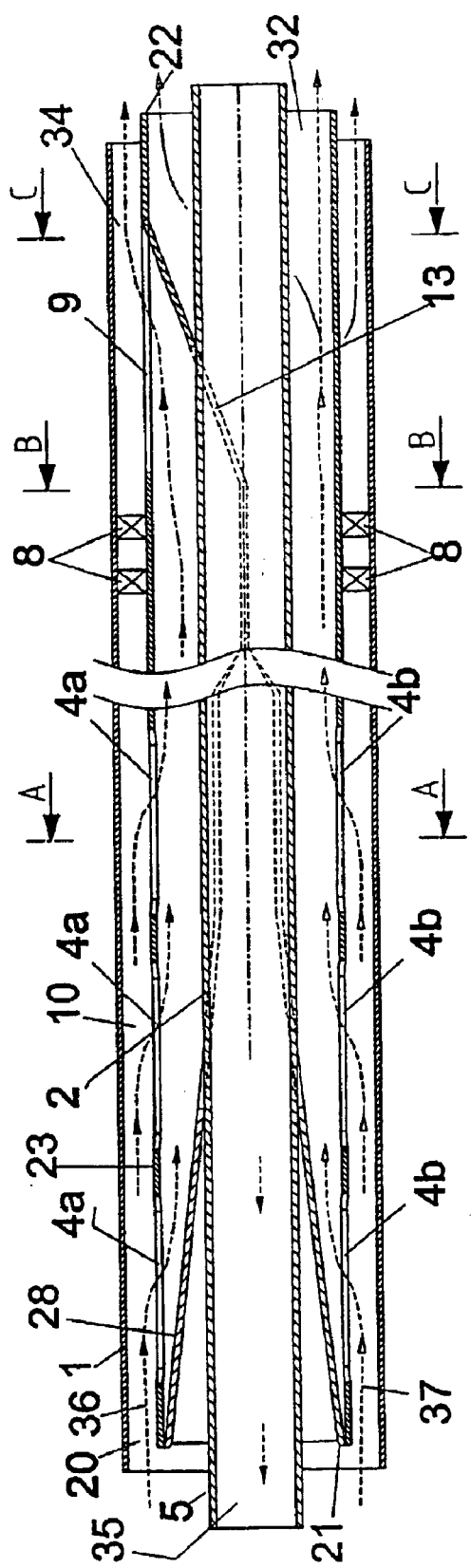
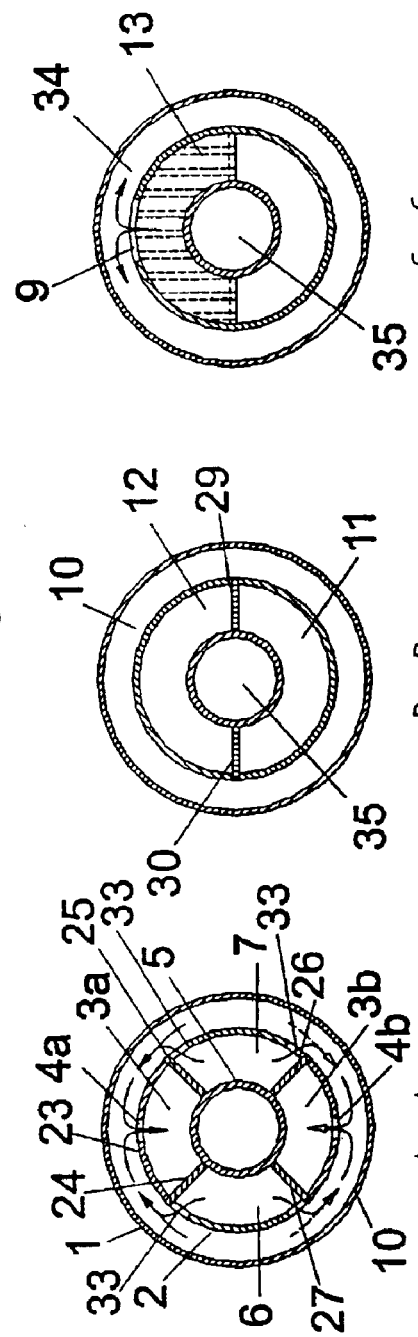
Fig. 2
Fig. 3a A-A
Fig. 3b B-B
Fig. 3c C-C

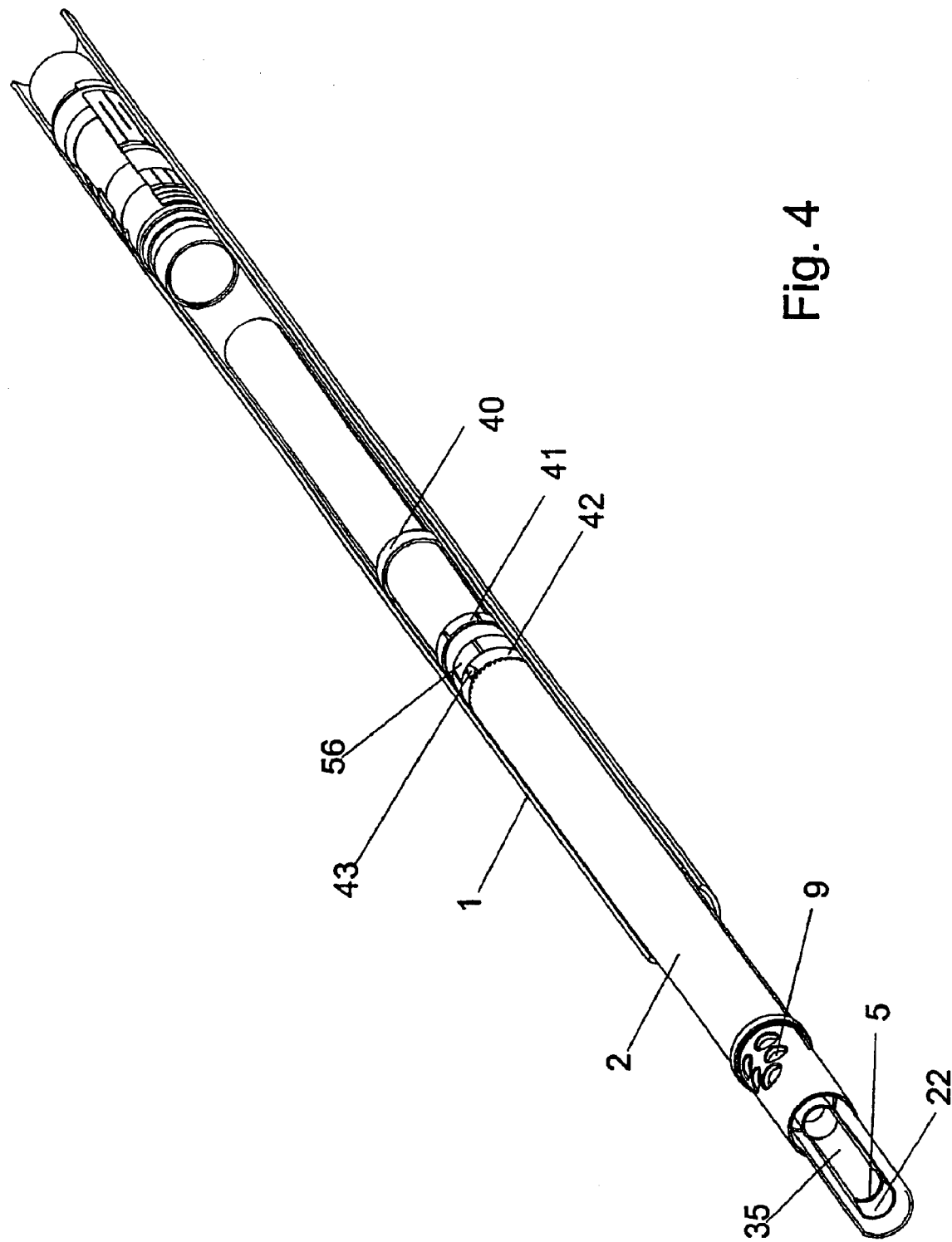

OUTLET ARRANGEMENT FOR DOWNHOLE SEPARATOR

RELATED APPLICATION

This application is a National Phase entry in the United States of the International Application PCT/NO01/00156 filed Apr. 09, 2001 and claims the benefit of the Norwegian application number 2000 1954 filed Apr. 13, 2000.

BACKGROUND OF THE INVENTION

1. Field of the Invention

The invention regards an outlet arrangement for use in separation of water and oil by means of a two-phase liquid/liquid separator in which the oil and water phases are respectively separated over at least part of the length of the separator from an upstream end to a downstream end of the separator. In particular, the invention regards an outlet arrangement for a horizontal gravity separator with a high length/diameter ratio. The invention especially regards a downhole separator for placing in an underground well. The invention also regards a method for inhibiting re-mixing of the oil and water phases in a separator where the separator includes a separator chamber with an upstream end and a downstream end and an oil outlet and a water outlet, the water outlet being situated in an upper part of the separator chamber and the oil outlet being situated in a lower part of the separator chamber.

The invention also regards a method for orienting an outlet arrangement in a horizontal downhole separator, as well as means of implementing this orientation.

2. Description of the Related Art

Separation of well fluids is usually carried out by use of a 3-phase gravity separator on a platform. Typically, the vessels have a diameter/length ratio in the range of 1:3 to 1:5. The separator is usually partially filled with gas, so as to provide two interfaces; a gas-liquid interface and an oil-water interface. Water and oil are extracted by means of a suitably elevated, vertically oriented pipe with a vortex breaker. The pipes are typically provided in the lower part of the vessel, at the opposite end from the fluid inlet. A weir plate is often used to isolate the water phase from the oil outlet. In this case, the oil-water interface is kept below the level of the weir plate, so that only the oil phase will flow over this.

In a horizontal tube or a vessel, the oil and water are separated by gravity due to the difference in density between the two phases, so as to form a lighter phase and a heavier phase. A stratified flow pattern must be maintained in order to be able to separate the liquid phases. The cross-sectional flow area is sized with respect to fluid velocity and water cut. If the residence time is sufficiently high to transfer droplets from the continuous phases, clean oil and water can be produced. The oil droplets will rise from the water phase, and if given sufficient residence time, they will reach the oil-water interface. Water droplets in the oil phase will settle and eventually reach the interface. Accumulated droplets of oil and water will form a dense layer in the interfacial region, in which coalescence takes place. If the residence time is sufficient, the dense layer will eventually be broken up.

Gas may be separated out from the well fluid by use of one or more cyclone separators. The water may also be cleaned by use of hydrocyclones. In a multi-stage separation system consisting of such separators, the main aim is to provide a clean oil phase. This is best achieved by employing a long, slim separator geometry in order to maximise the oil-water interface where the coalescence of the droplets takes place. Furthermore, the distance to the oil-water interface, across which distance the droplets have to travel, is reduced.

A downhole oil/water gravity separator in which the separation takes place in a section of the production tubing in a horizontal well, such as disclosed in WO 98/41304, is a separator with a very high length to diameter ratio. A separator of this type will typically have a length of approximately 100 m, while the diameter is the same as for the production tubing, for instance 9", 10¾" or 13", i.e. a length-diameter ratio of 1:300 to 1:400.

A large oil-water interface and sufficient residence time alone is not enough to achieve clean oil and water phases at the outlet of the separator. It is crucial that the separation of oil and water take place without either of the phases becoming contaminated by the other upon extraction from the separator.

Since the diameter of the outlet is small, this will easily influence the oil-water interface and thereby result in water entering the oil phase and oil entering the water phase.

SUMMARY OF THE INVENTION

It is therefore an object of the present invention to ensure that each of the phases is distributed to the appropriate outlet without interfering with the oil-water interface and re-mixing the phases. As the phases exist in a separated state as much as several meters before the end of the separator, each of them should be extracted gradually over a certain distance before the end wall of the separator. Through such gradual extraction of separated fluids, the residence time for the remaining liquid in the separator will be extended, allowing the smaller oil and water droplets to migrate to the oil and water phases respectively. This is achieved by a two phase liquid/liquid separator in which the oil and water phases respectively are separated over at least part of the length of the separator from an upstream end to a downstream end of the separator wherein the oil and water phases are respectively are extracted gradually over a length of the separator, the length extending substantially all the way from the downstream separator and wherein the oil and water phases respectively are extracted substantially symmetrically respective to longitudinal axis of the separator and wherein each of the phases is extracted from the separator separately. This is further achieved by an arrangement at a separator for separating oil from water, the arrangement including a separator chamber with an upstream and a downstream end and an oil outlet and a water outlet, the water outlet being situated in an upper part of the separator chamber and the oil outlet being situated in a lower outlet of the separator chamber wherein the oil and water outlet are respectively distributed over a length of the separator at the downstream end of this and wherein the oil and water outlets, with respect to each other, are arranged substantially symmetrically relative to the longitudinal axis of the separator.

In the case of an outlet arrangement of the type with which the present invention is concerned, it is important for the separator to have the correct orientation, so that the oil outlets face upwards and the water outlets face downwards. According to the present invention, a method and an arrangement have therefore been provided in order to achieve this. The method is characterised by orienting an outlet arrangement in a horizontal downhole separator such that a guide device is inserted into a hole and fixed relative to the hole, inserting a measuring tool into the hole in order to register the orientation of first guide means on the guide device, setting second guide means on the separator, the second guide means corresponding to the first guide means, in accordance with the orientation of the first guide means, inserting the separator with the outlet arrangement into the hole, and rotating the separator to a predetermined lintation upon contact between the first and second guide means. When oil and water are extracted from the separator over a certain distance, the effect on the interface is lessened. It becomes easier to avoid extracting liquid from the area near the interface. Small, dispersed droplets of the opposite phase will often be present near the interface, e.g. water droplets in the oil phase and oil droplets in the water phase. These droplets will be given more time to coalesce and migrate to the phase to which they belong.

The outlet arrangement according to the present invention also aims to have a design which is such that oil and water are gradually extracted in a radial direction from the upper and the lower part of the separator housing, near the separator wall.

By the arrangement according to the invention, the oil and water outlets respectively are distributed over a certain axial distance at the downstream end of the separator.

By such an arrangement, clean oil and water may be collected as early as possible upon becoming accessible, and then be transported out of the separator via the outlet pipe. Any disturbance of the liquid phases will be minimal when oil and water are removed over an extended distance. By constructing outlet slots or holes with a decreasing cross sectional area in the downstream direction, the velocity of the liquid in the outlet pipe will increase in the downstream direction. The acceleration is preferably linear. When the clean oil and water are brought out at a higher velocity than the mean bulk velocity in the separator, the total residence time is increased, making it easier for smaller droplets to coalesce and migrate.

Heavier solids will have time to settle in the separator, while lighter particles will be carried along by the liquid phases. By the arrangement according to the present invention, it is also possible to avoid solids accumulating near the outlet and blocking this. By extracting water near the bottom of the separator, the liquid flow will also sweep away solids near the bottom and carry these out with the water.

BRIEF DESCRIPTION OF THE DRAWINGS

In the following, the invention will be explained by means of an example of an embodiment of an arrangement and a separator in accordance with the present invention, with reference to the accompanying drawings, in which:

FIG. 2 is a longitudinal section of a part of a separator according to the present invention, including the outlet arrangement shown in FIG. 1;

FIGS. 3a–c are sections along the lines A—A, B—B and C—C in FIG. 2 respectively;

FIG. 4 shows a separator equipped with guide means for orienting the separator;

DETAILED DESCRIPTION OF THE PREFERRED EMBODIMENTS

Figure 1:
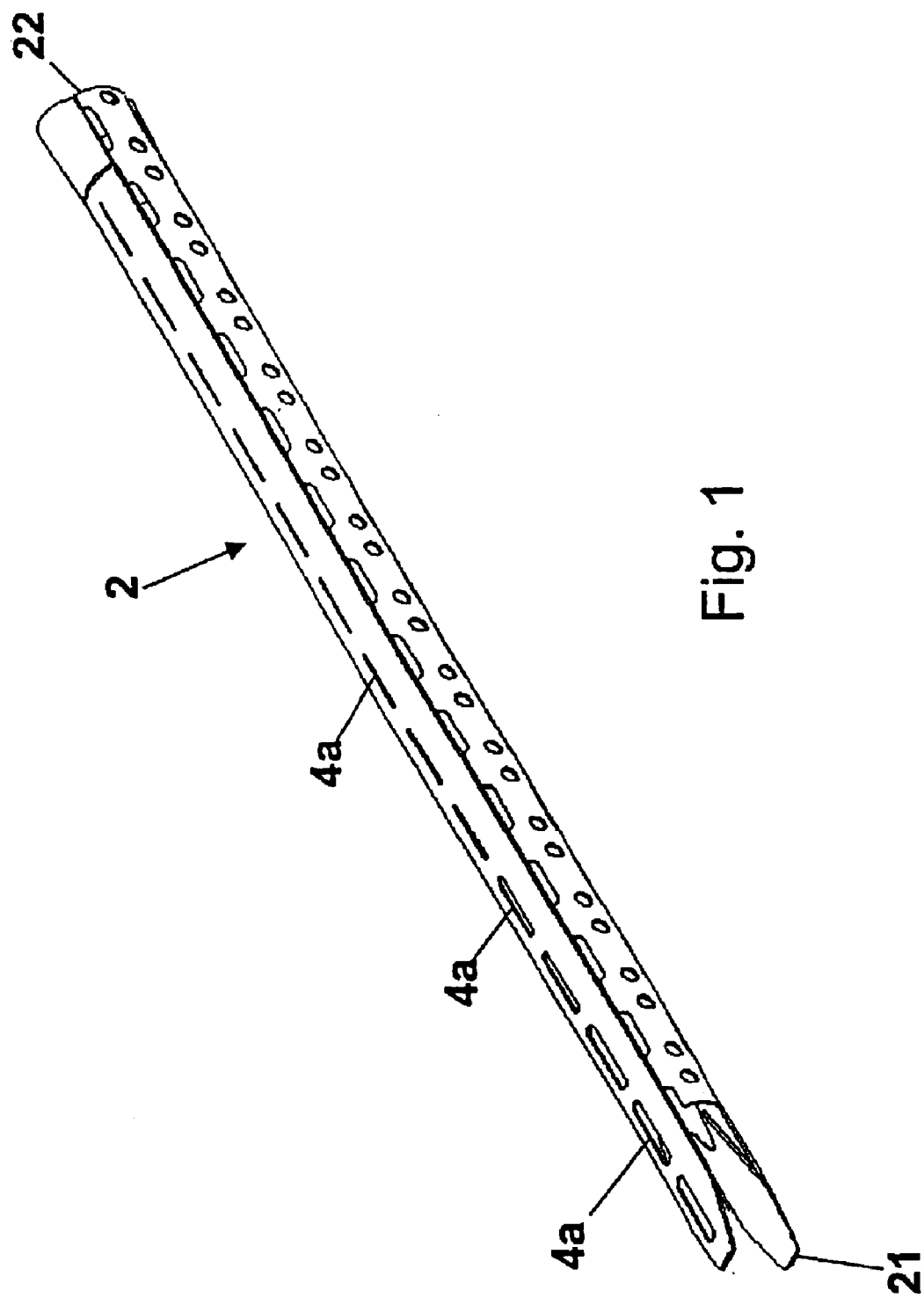
FIG. 1 is a perspective drawing showing an outlet arrangement in accordance with the present invention.

FIGS. 2 and 3a, b, and c show a longitudinal and transverse sections respectively through part of a liquid-liquid separator according to the present invention and including the outlet arrangement shown in FIG. 1. The separator has a high length to diameter ratio.

The separator comprises a separator wall 1 tubularly enclosing a separator chamber 20. An outlet arrangement 2 is provided inside the separator chamber 20. The outlet arrangement 2 is positioned along the longitudinal axis of the separator chamber 20, and extends over a length of e.g. 2–4 meters at the downstream end of the separator.

The outlet arrangement 2 has an outer end 21 facing the upstream direction and an inner end 22 that is connected to transport conduits outside the separator (not shown). The outlet arrangement further comprises an outer wall 23 that forms a pipe having approximately the same cross section along the length of the outlet arrangement 2. An annulus 10 is defined between the separator wall 1 and the outer wall 23. First inlet orifices 4a are formed in the outer wall 23, on one side of the outer wall 23, and second inlet orifices 4b on the opposite side of the outer wall. As shown for orifices 4a in FIG. 1, the orifices 4a and 4b have a decreasing cross section from the outer end 21 of the outlet arrangement 2 to the inner end 22. In the embodiment shown, this has been accomplished by reducing the width of the inwardlying orifice 4a, 4b in relation to the outwardlying orifice 4a, 4b.

The outlet arrangement 2 includes an inner wall 5 that is concentric with the outer wall 23, which inner wall 5 also extends tubularly with a circular cross section along the longitudinal axis of the separator. An annulus 32 is defined between the outer wall 23 and the inner wall 5.

As shown in FIG. 3a, four longitudinal walls 24, 25, 26 and 27 are provided between the outer wall 23 and the inner wall 5, which walls extend along most of the length of the outlet arrangement 2. A channel 3a is defined between walls 24 and 25, the outer wall 23 and the inner wall 5. A channel 7 is defined between walls 25 and 26, the outer wall 23 and the inner wall 5. A channel 3b is defined between walls 26 and 27, the outer wall 23 and the inner wall 5. A channel 6 is defined between walls 27 and 24, the outer wall 23 and the inner wall 5.

Near the outer end 21, the walls 24, 25, 26 and 27 become a cone 28. Near the inner end 22, the walls 24, 25, 26 and 27 become two longitudinal walls 29 and 30 (see FIG. 3b) extending between the outer wall 23 and the inner wall 5. Above walls 29 and 30 and between the outer wall 23 and the inner wall 5, there is defined a channel 12. Below walls 29 and 30 and between the outer wall 23 and the inner wall 5, there is defined a channel 11.

The walls 24, 25, 26 and 27 and the walls 29 and 30 all have a point of intersection at the longitudinal axis of the separator.

Even closer to the inner end 22, the walls 29 and 30 deflect upwards and converge to form a sloping wall 13. The sloping wall 13 closes off the channel 12 above the walls 29 and 30.

In the part of the outer wall 23 that is located outside of the channels 6 and 17, a plurality of orifices 33 are formed so as to let the annulus 10 communicate freely with the channels 6 and 7. The separator chamber available for performing separation outside of the outlet arrangement is therefore the combination of the annulus 10 and the channels 6 and 7, between which there is fluid communication. In principle, the portions of the outer wall 23 located outside of the channels 6 and 7 have no other function than to ensure that the outlet arrangement achieves greater rigidity.

Immediately outside of the sloping wall 13, a plurality of packings 8 have been provided in the annulus 10, which packings 8 form a liquid tight end of the separator chamber 20.

An opening 9 is formed in the outer wall 23 between the packings 8 and the sloping wall 13. This opening 9 connects the channel 3a with an annulus 34 located inside the packings and between the separator wall 1 and the outer wall 23. Beyond the sloping wall 13, an annulus 32 is defined between the outer wall 23 and the inner wall 5.

A channel 35 is defined within the tubular inner wall 5.

The functioning of the separator and the outlet arrangement according to the invention will now be explained.

Water and oil flow in towards the outlet arrangement 2 from the left in FIG. 2. The water and the oil are then already more or less completely separated. The oil indicated by arrows 36 will settle at the top of the separator and flow in through the orifices 4a in the upper side of the outer wall 23. The water indicated by arrows 37 will settle at the bottom of the separator and flow in through the orifices 4b in the underside of the outer wall 23.

A local drop in the velocity of the liquid phases will occur at the outer end 21 due to the cone 28 that causes a narrowing of the cross section.

The oil will flow on through channel 3a at a velocity that increases as the flow nears the inner end 22 of the outlet arrangement 2. Most of the oil will flow into channel 3a through the orifices 4a closest to the outer end 21 of the outlet arrangement and to a lesser extent near the inner end 22. The oil continues further through channel 3a and channel 12, and out through the opening 9 and into the annulus 34, from which it is transported to the surface.

Likewise, the water will flow on through channel 3b at a velocity that increases as the flow nears the inner end 22 of the outlet arrangement 2. Most of the water will flow into channel 3b through the orifices 4b closest to the outer end 21 of the outlet arrangement and to a lesser extent near the inner end 22. The water flows from channel 3b and into channel 11. Immediately beyond the sloping wall 13, the water is allowed to fill the entire annulus 32. From here, the water may be transported to the surface, or it may be sent back via channel 35 by means of a pump (not shown), to be injected into the formation. If injection is not an issue, this pipe may be replaced by partitions.

In the case of an outlet arrangement of the above mentioned type, it is important that this is oriented correctly in the separator, so as to leave the orifices 4a facing upwards and the orifices 4b facing downwards. Even though the outlet arrangement can tolerate a certain amount of deviation from this, the performance of the outlet arrangement will deteriorate with any major deviation from this orientation. Below is described an example of an embodiment of the present invention, which embodiment ensures the correct orientation of the outlet arrangement.

Figure 5:
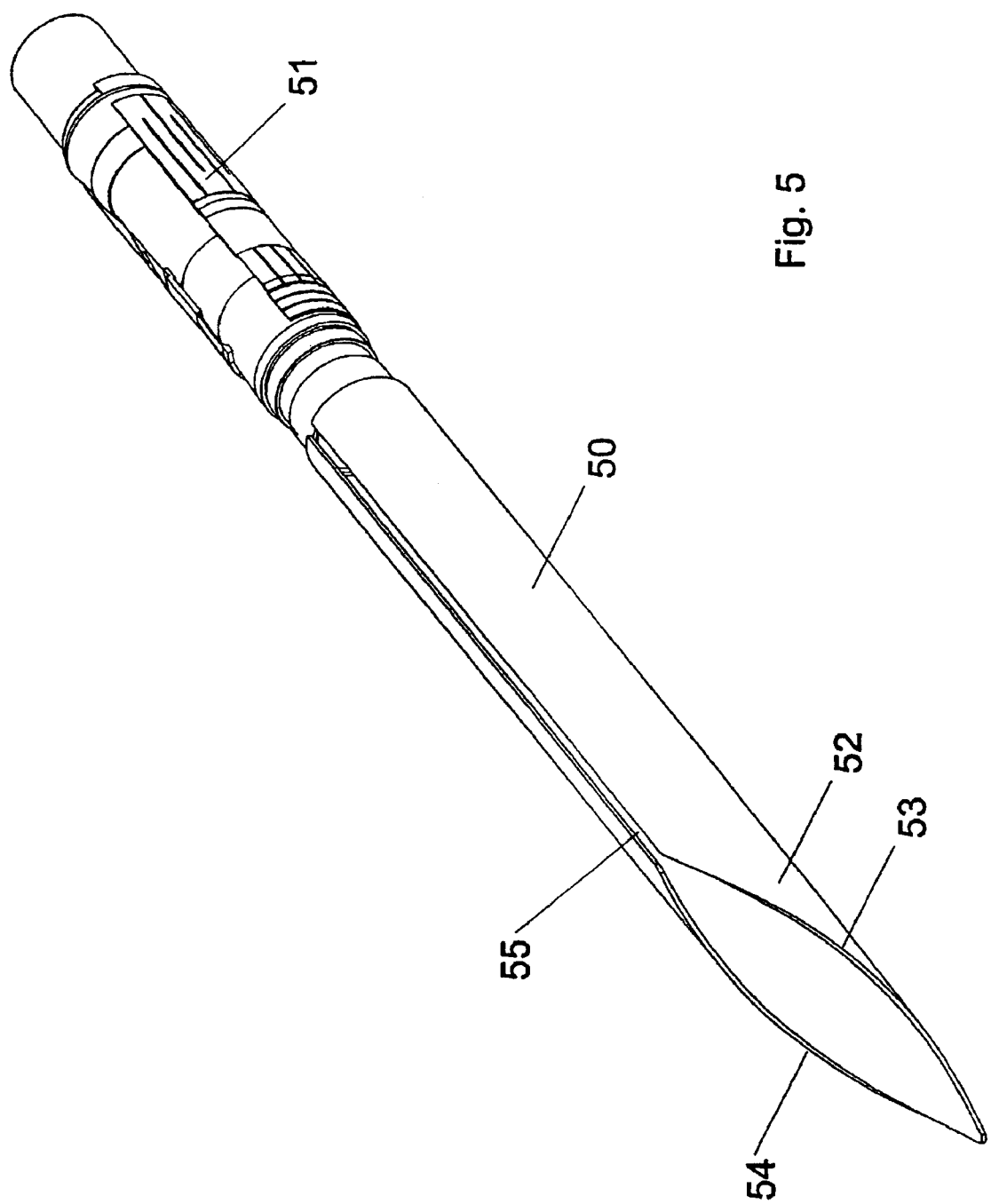
FIG. 5 shows a guide sleeve to be used when orienting the separator.

FIGS. 4 and 5 show devices for orienting the outlet arrangement according to FIGS. 1–3. FIG. 4 shows a separator according to the present invention. The separator wall 1 is shown furthest out. The outlet arrangement 2 is placed inside this. The end 22 of the outlet arrangement faces left in the Figure. Here, several openings 9 are shown. The channel 35 in the pipe 5 is also shown.

On the outside of the separator is provided lock nuts 40 and 41 for a packer (not shown). A gear rim 42 equipped with a key 43 is also provided. The key 43 is a wedge that may be moved along the periphery of the gear rim 42 and locked into this. This may for instance be implemented by placing the key 43 in one of several slots in the toothed ring 42. A locking ring 56 is also provided in connection with the gear rim 42, in order to lock the gear rim 42 to the separator.

Figure 6:
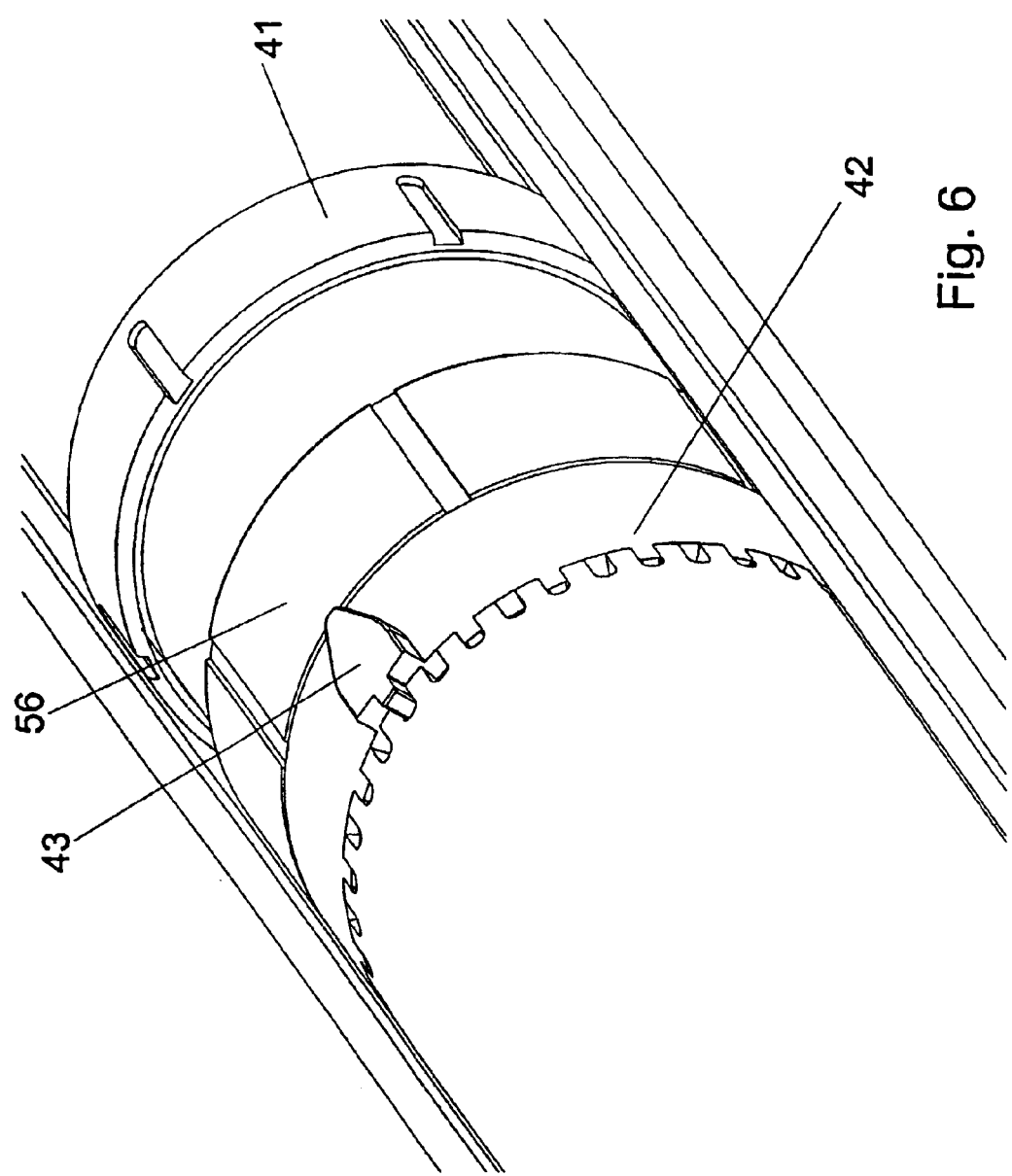
FIG. 6 shows a detail of a gear rim that forms part of the guide means.

FIG. 6 shows the gear rim 42 with wedge 43 and key slot 57 in detail. The key slots are spaced at angular interval of e.g. 5°.

FIG. 5 shows a guide sleeve 50. A wedge belt 51 is provided about the periphery of the guide sleeve 50. This wedge belt 51 may have a conventional construction, and is designed to fix the guide sleeve 50 in the casing (not shown). At one end 52, the guide sleeve 50 has been bevelled so as to form a guide edge 53 and 54. The guide edges 53 and 54 extend in towards a guideway 55 that extends along a length of the guide sleeve.

When the separator is to be placed in the well, the guide sleeve 50 is first inserted into the hole with the end 52 facing upwards, until it reaches a horizontal part of the well, in which part the separator is required to be placed. Upon reaching this site, the wedge belt 51 is activated so that the guide sleeve is immobilised against the casing. Then a monitoring tool of a type that is known per se is inserted into the well in order to register the direction in which the guideway 55 has been oriented. This measurement determines the positioning of the key 43 along the periphery of the gear rim 42.

The key is then placed at the same angle relative to the inlet orifices 4a as that formed by the guideway 55 in relation to the upward direction. The separator is then inserted into the well. They key 43 contacts one of the guide edges 53, 54. As the separator is inserted into the guide sleeve, the guide edge 53 or 54 causes the separator to rotate until the key 43 is flush with the guideway 55. When the key 43 is inserted into the guideway 55, the separator has the correct orientation. Finally, the separator is fixed by means (not shown) that are know per se, and the remaining required pipes are connected to it.

Instead of the key being located on the separator and the guide surfaces with the guideway being provided on a guide sleeve, it is also possible to provide the separator with guide surfaces and a guideway, and fixing a device comprising a key in the casing.

What is claimed is:

1. A method of separating oil and water with a two-phase liquid/liquid separator, in which the oil and water phases respectively are separated over at least part of the length of the separator from an upstream end to a downstream end of the separator, wherein the oil and water phases respectively are extracted gradually over a length of the separator, the length extending substantially all the way to the downstream end of the separator, and wherein the oil and water phases, respectively, are extracted substantially symmetrically relative to the longitudinal axis of the separator and wherein each of the phases is extracted from the separator separately.

2. The method according to claim 1, wherein each phase is substantially evenly extracted over said length of the separator.

3. The method according to claim 1, wherein accumulated solids are carried out of the separator together with the separated water phase.

4. An arrangement at a separator for separating oil and water, comprising a separator chamber with an upstream end and downstream end and an oil outlet and a water outlet, the water outlet being situated in a lower part of the separator chamber and the oil outlet being situated in an upper part of the separator chamber, characterised in that the oil and water outlets respectively are distributed over a length of the separator at the downstream end of this and that the oil and water outlets with respect to each other are arranged substantially symmetrically relative to a longitudinal axis of the separator.

5. The arrangement according to claim 4, characterised in that the oil and water outlets respectively comprise orifices with a gradually decreasing cross sectional area from the upstream end to the downstream end of the separator.

6. The arrangement according to claim 4 wherein the oil outlet is located near an upper boundary of the separator chamber and the water outlet is located near a lower boundary of the separator chamber.

7. The arrangement of claim 4, wherein the oil and water outlets respectively are included in an outlet arrangement having an outer wall and at least one longitudinal wall defining an oil outlet channel and a water outlet channel.

8. The arrangement according to claim 7, characterised in that the oil outlet channel is defined by a first portion of any annulus between the outer wall and an inner wall, and that the water outlet channel is defined by a second portion of an annulus between the outer wall and the inner wall.

9. The arrangement of claim 7, wherein the oil and water outlet channels respectively are designed so as to position the oil outlet generally at the top and the water outlet generally at the bottom with respect to vertical, and generally at the downstream end of the separator chamber.

10. The arrangement according to claim 9, wherein, for orienting the outlet in the vertical plane, the outlet arrangement is rotated to a desired orientation during insertion into a guide sleeve with a guideway that gives the desired orientation in a rotational plane.

11. The arrangement according to claim 8, characterised in that at least one packing is provided between the separator wall and the outer wall in order to form a liquid tight end of the separator chamber.

12. The arrangement according to claim 11, characterised in that the oil outlet channel communicates with an oil outlet annulus downstream of the at least one packing, which annulus is defined between the separator wall and the outer wall, and that the water outlet channel communicates with a water outlet annulus downstream of the at least one packing, which annulus is defined between the outer wall and the inner wall.

13. The arrangement according to claim 8, characterised in that a channel defined inside the inner wall is designed to transport water for water injection.

14. The arrangement claim 4, wherein the oil and water outlet, respectively, are distributed over a length of 2–4 meters.

* * * * *

UNITED STATES PATENT AND TRADEMARK OFFICE
CERTIFICATE OF CORRECTION

PATENT NO. : 6,868,907 B2
DATED : March 22, 2005
INVENTOR(S) : Homstvedt et al.

It is certified that error appears in the above-identified patent and that said Letters Patent is hereby corrected as shown below:

Column 8,
Line 18, after "arrangement" insert -- according to --.

Signed and Sealed this

Fourth Day of October, 2005

JON W. DUDAS
*Director of the United States Patent and Trademark Office*